United States Patent [19]
Yoo et al.

[11] Patent Number: 5,920,425
[45] Date of Patent: Jul. 6, 1999

[54] INTERNAL LIGHTING DEVICE FOR A VIDEO MICROSCOPE SYSTEM

[75] Inventors: Myeong-Ho Yoo; Jun-Ho Kim, both of Suwon-si, Rep. of Korea

[73] Assignee: Samsung Aerospace Industries, Ltd., Kyungsangnam-do, Rep. of Korea

[21] Appl. No.: 08/714,333

[22] Filed: Sep. 18, 1996

[30] Foreign Application Priority Data

Sep. 22, 1995 [KR] Rep. of Korea ................ 95-31356
Feb. 21, 1996 [KR] Rep. of Korea ................ 96-2614

[51] Int. Cl.⁶ ............................ G02B 21/06; G02B 21/36
[52] U.S. Cl. ........................ 359/390; 359/385; 359/363
[58] Field of Search .................. 359/362–363, 359/368, 385–390, 599; 362/31–32; 385/901; 351/205–214, 241

[56] References Cited

U.S. PATENT DOCUMENTS

| | | | |
|---|---|---|---|
| 2,691,918 | 10/1954 | Robins et al. | 359/389 |
| 3,499,715 | 3/1970 | Hansen et al. | 359/389 |
| 3,848,122 | 11/1974 | Hutchison, III | 359/599 |
| 4,601,551 | 7/1986 | Pettingell et al. | 359/387 |
| 4,911,543 | 3/1990 | Hodgson | 359/385 |
| 5,006,872 | 4/1991 | Parker | 359/363 |
| 5,052,789 | 10/1991 | Kleinberg | 359/375 |
| 5,144,477 | 9/1992 | White | 359/389 |
| 5,325,231 | 6/1994 | Tamura et al. | 359/387 |
| 5,400,176 | 3/1995 | Dreessen et al. | 359/385 |
| 5,469,294 | 11/1995 | Wilt et al. | 359/385 |
| 5,523,583 | 6/1996 | Choate | 359/363 |
| 5,566,020 | 10/1996 | Bradford et al. | 359/363 |
| 5,619,031 | 4/1997 | Choate | 359/363 |

FOREIGN PATENT DOCUMENTS

| | | | |
|---|---|---|---|
| 164 680 | 12/1985 | European Pat. Off. | 359/385 |
| 32116 | 4/1981 | Japan | 359/385 |
| 213404 | 8/1992 | Japan | 359/385 |
| 2052784 | 1/1981 | United Kingdom | 359/389 |

*Primary Examiner*—Thong Nguyen
*Attorney, Agent, or Firm*—Finnegan, Henderson, Farabow, Garrett & Dunner, L.L.P.

[57] ABSTRACT

An internal lighting device for a video microscope system coupled to a video machine, such as a video presenter, that can be used to observe an object. The internal lighting device uses a source mounted in the video machine or on a video microscope, and comprises a light source for projecting a predetermined amount of light and a light transmitter for projecting the light emitted from the light source part to an object to be observed using the video microscope system.

8 Claims, 6 Drawing Sheets

INTERNAL LIGHTING DEVICE FOR A VIDEO MICROSCOPE SYSTEM

BACKGROUND OF THE INVENTION

A. Field of the Invention

The present invention relates to a video microscope system and lighting device. More particularly, the present invention relates to a video microscope system coupled to a video machine, such as a video presenter, including an internal lighting device that is mounted either in the video machine or to the video microscope system. The internal lighting device is optically connected to the video microscope system.

B. Description of the Prior Art

Generally, a video presenter using a CCD (Charge Coupled Device) converts an optical image into an electric signal and outputs the electric signal. The outputted signal is transmitted to an image display device, such as a monitor or a television screen, and reproduced into a video image.

Recently, the use of a video presenter, which reads an optical image of an object placed on a stage and transmits an electrical signal of the optical image to an image display device, such as a television screen, is increasing. The video presenter is mainly used to enhance a presentation by effectively reproducing images such as image data from a three-dimensional object or a color picture album.

The video presenter picks up the image of an object placed on the stage, converts the picked up image into an electrical signal, and transmits the corresponding electrical signal to an image display device. The image display device reproduces the pickup image. In addition, the video presenter enables a user to observe even a minute portion of the object at the image display device when it is coupled with a video microscope system.

That is to say, after an image pickup device of the video presenter picks up the image of the object placed on a stage of a video microscope system, it is possible for the user to observe the object by transmitting the corresponding electrical signal to an image display device and reproducing the image signal as the video image on the image display device.

Hereinafter, the operation of the conventional video microscope system will be explained with reference to the accompanying drawing.

FIG. 1 is a cross-sectional view illustrating the conventional video microscope system.

Referring to FIG. 1, the conventional video microscope system includes a microscope lens unit 101 having a lens barrel 102, and a plurality of lenses 102a inserted into lens barrel 102, an objective part 107 on which an object 113 is placed, and an external lighting device 105 for supplying light having the required ambient brightness around object 113. External lighting device 105 includes a light box 109 and an optical fiber 111 for transmitting the light emitted from light box 109 to object 113.

To image the object formed through the above-mentioned video microscope system at the video presenter (not shown except for an image pickup part 103, see below), light, emitted from external lighting device 105, is transmitted through optical fiber 111 and projected to object 113, which is placed on objective part 107. Microscope lens unit 101 forms the image of object 113 according to the ambient brightness of the light surrounding object 113.

The image of object 113 formed by microscope lens unit 101 is inputted into an image pickup part 103 in the video presenter (not shown except for image pickup part 103) and converted into an electric signal. The electrical signal is transmitted to an image display device, such as a monitor (not shown), to reproduce the original image.

At this time, the display of object 113 may be observed as an enlarged image by varying the magnification of the lenses of microscope lens unit 101. However, the conventional video microscope system has the disadvantages in that a projecting angle of the light is individually controlled whenever the user observes the object using the conventional video microscope system because an additional external light source is needed to supply the light having the brightness required for the observation of the object. Additionally, it is not convenient to carry the conventional video microscope system because it requires the additional external light source.

SUMMARY OF THE INVENTION

Accordingly, the object of the present invention is to provide a video microscope system coupled to a video machine, such as a video presenter, that includes an internal lighting device mounted either in the video presenter or to the video microscope system. The internal lighting device is optically connected to the video microscope system.

To achieve the object and in accordance with the purpose of the invention, as embodied and broadly described herein, the video microscope system coupled to a video machine comprises a microscope lens unit having a plurality of lenses, an objective part on which an object is placed, and a lighting device optically connected to the video microscope and mounted to the microscope lens unit for supplying light to the object.

According to another aspect of the present invention, a lighting device in a video microscope system connected to a video presenter for observing an object comprises a light source part mounted in the video machine for projecting a predetermined amount of light, a microscope lens unit having a plurality of lenses coupled to the video machine, an objective part on which an object is placed, and light transmitting means for projecting the light emitted from the light source part to the object.

According to a further aspect of the present invention, a lighting device in the video microscope system connected to a video presenter for observing an object comprises a light source part mounted in a video presenter for projecting a predetermined amount of light, a microscope lens unit having a plurality of lenses coupled to the video machine, an objective part on which an object is placed, light transmitting means for projecting the light emitted from the light source part to the object, and a member fixing an output end portion of the light transmitting means to one side of the video microscope system.

Additional objects, embodiments, and advantages of the invention are set forth in part in the description which follows, and in part will be obvious from the description, or may be learned by practice of the invention. The objects, embodiments, and advantages of the invention will be realized and attained by means of the elements and combinations particularly pointed out in the appended claims.

BRIEF DESCRIPTION OF THE DRAWINGS

The accompanying drawings, illustrate three embodiments of the invention and, together with the description, serve to explain the principles of the invention.

In the drawings.

DESCRIPTION OF THE PREFERRED EMBODIMENTS

Reference will now be made in detail to the preferred embodiments of the present invention, examples of which are illustrated in the accompanying drawings.

Figure 1:
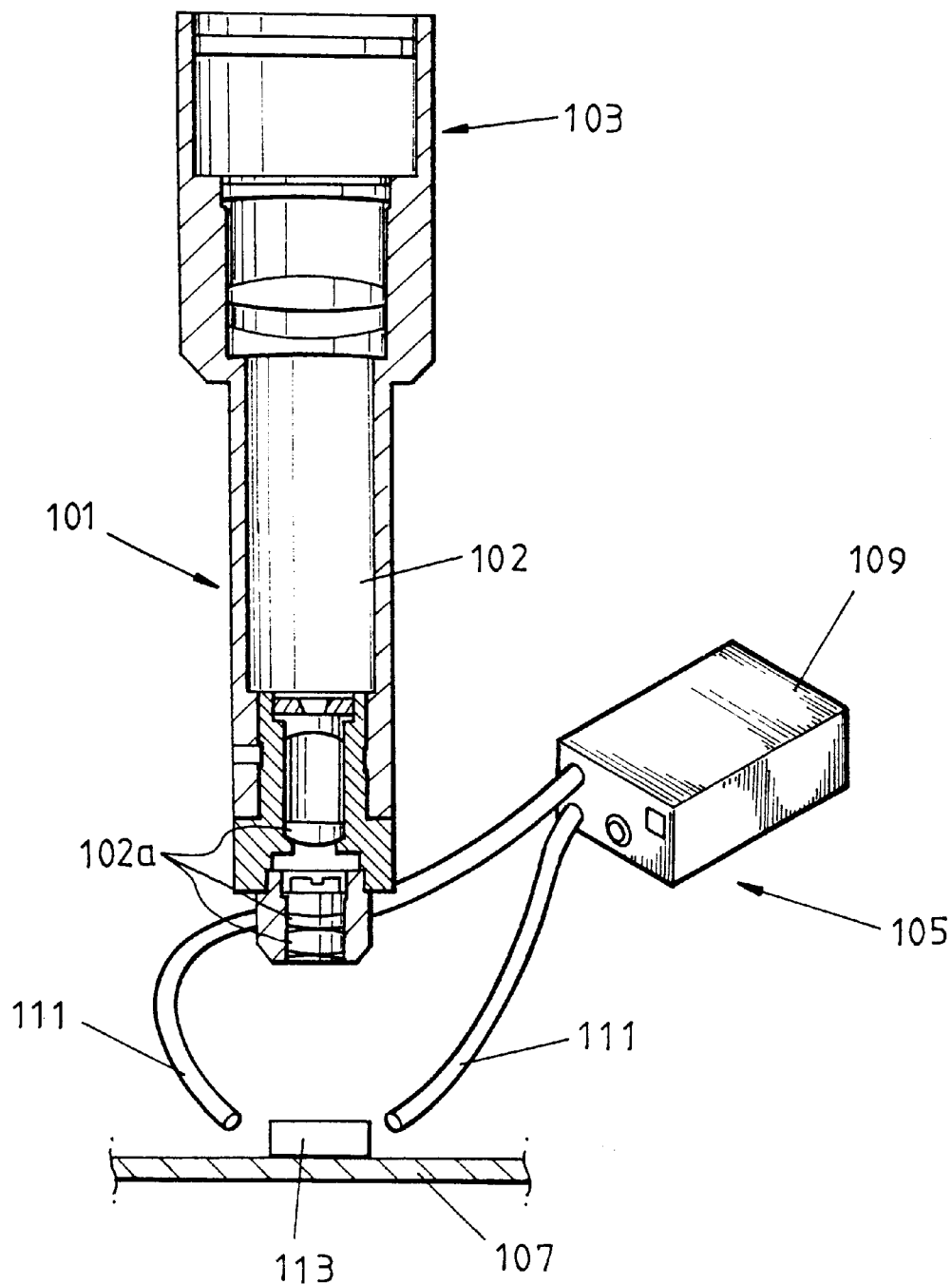
FIG. 1 is a cross-sectional view illustrating a conventional video microscope system.
Figure 2:
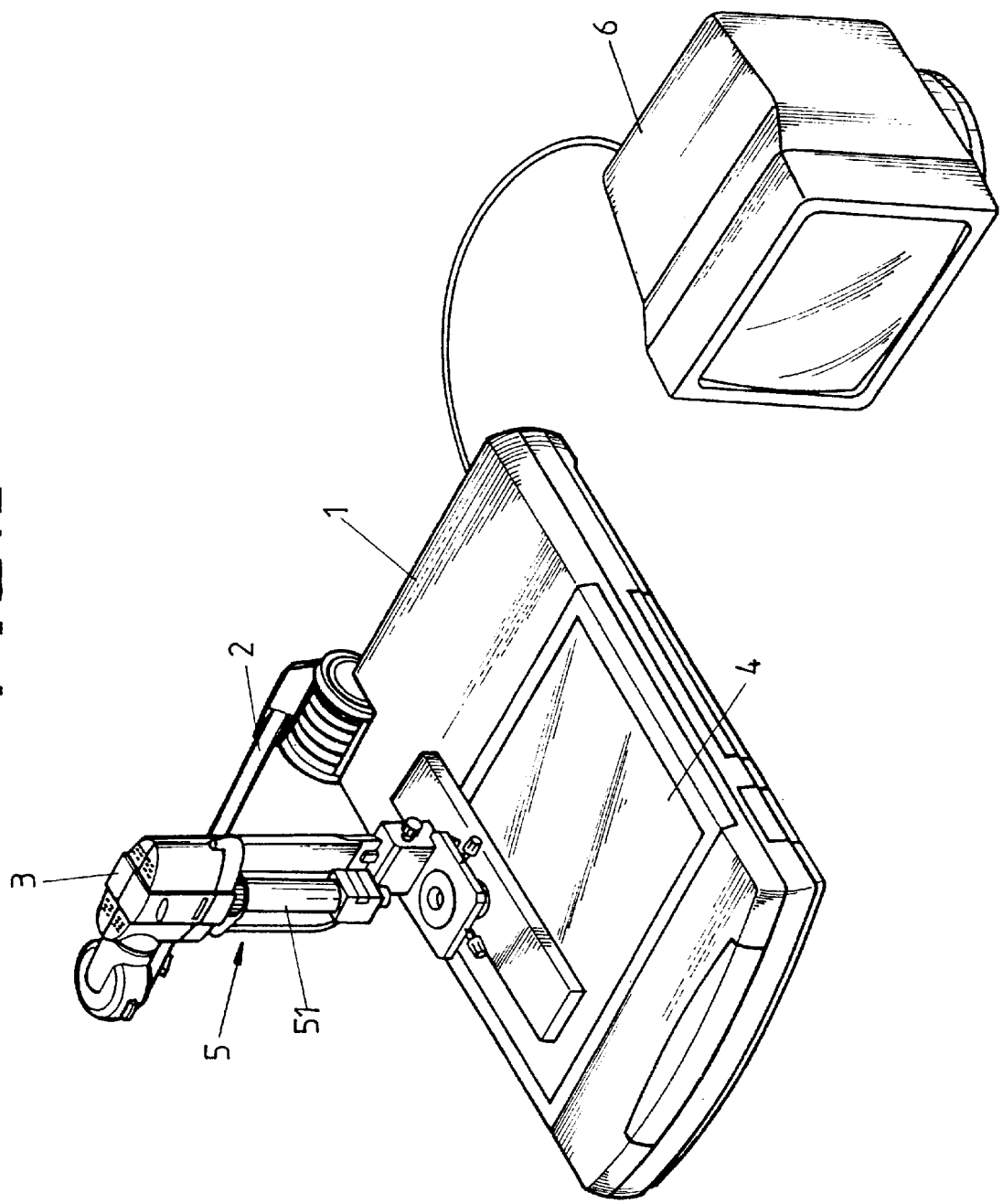
FIG. 2 is a view illustrating a video microscope system in accordance with a preferred embodiment of the present invention as a part of a video presenter coupled to a image display device.

Referring to FIG. 2, a video presenter connected to the video microscope system in accordance with the first preferred embodiment of the present invention includes a main body 1 having an internal light box with a built-in light source, a supporting member 2 extended upward from one side of main body 1, and a head unit 3 hinged on an upper portion of supporting member 2. Head unit 3 has an internally connected light source for emitting a predetermined amount of light, a microscope lens unit 51, and an image pickup device (not shown) for picking up the image of the object. An adapter (not shown) is formed on a bottom portion of head unit 3 to connect a lens for conversion selected according to what kind of object is being observed. The video presenter is coupled to image display device 6.

Figure 3:
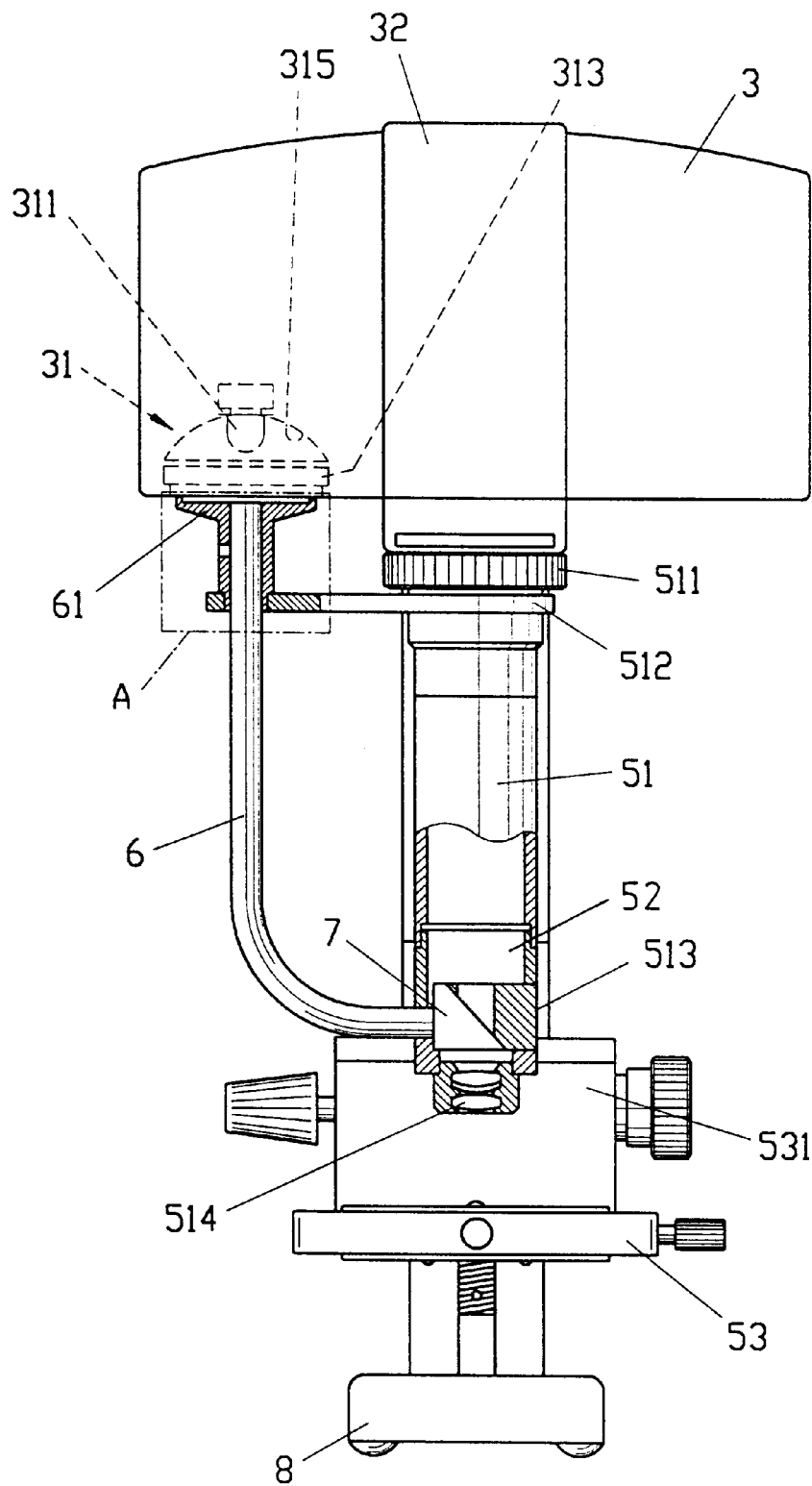
FIG. 3 is a cross-sectional view illustrating a lighting device of a video microscope system in accordance with a first preferred embodiment of the present invention.

Referring to FIG. 3, an internal lighting device of the video microscope system connected to the video presenter in accordance with the first preferred embodiment of the present invention includes a light source part 31 mounted in head unit 3 for projecting a predetermined amount of light to an object. An optical fiber 6 is connected to microscope lens unit 51 for supplying the light projected from light source part 31 to microscope lens unit 51, a prism 7 is mounted within microscope lens unit 51 for supplying light to the object positioned on an objective part 53 by reflecting the light supplied through optical fiber 6. As an alternative to reflecting, prism 7 could be constructed to refract the light supplied through optical fiber 6. In other words, the light would travel through prism 7 and have its direction changed (refracted) such that the light is supplied to the object positioned on the objective part 53. Objective part 53 is supported on a base 8, or other suitable support.

Light source part 31 includes a light source 311 for projecting a predetermined amount of light, a diffusion plate 313 for diffusing the light projected from light source 311, and a reflective plate 315 mounted in a rear part of light source part 31 for reflecting projected light to diffusion plate 313. Light source 311 in accordance with the preferred embodiment of the present invention is a halogen lamp, but it is not necessarily limited to the halogen lamp.

Referring to FIG. 3, a screw thread (not shown) formed on an outer circumference of an upper part of microscope lens unit 51 is screwed to a fixing ring 511. Fixing ring 511 is screwed to a screw thread formed in an inner circumference of an adapter (not shown) exposed on an upper part of microscope lens unit 51, whereby microscope lens unit 51 is connected to a bottom of head unit 3.

Microscope lens unit 51 includes a microscope magnification lens group 52 and a high magnification lens group 514. High magnification lens group 514 is mounted at the bottom of microscope lens unit 51. Prism 7 is mounted between microscope magnification lens group 52 and high magnification lens group 514. Microscope lens unit 51 is screwed to a fixing plate 512 and fixing ring 511 is on top of fixing plate 512.

Figure 4:
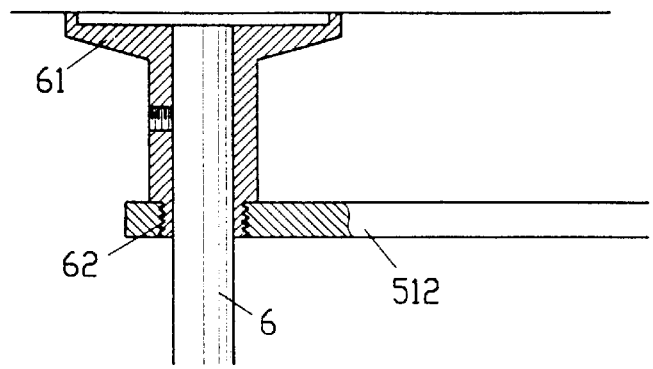
FIG. 4 is an enlarged cross-sectional view of a connection portion of an optical fiber and the connecting plate of a lighting device of a video microscope system in accordance with a first preferred embodiment of the present invention.
Figure 5:
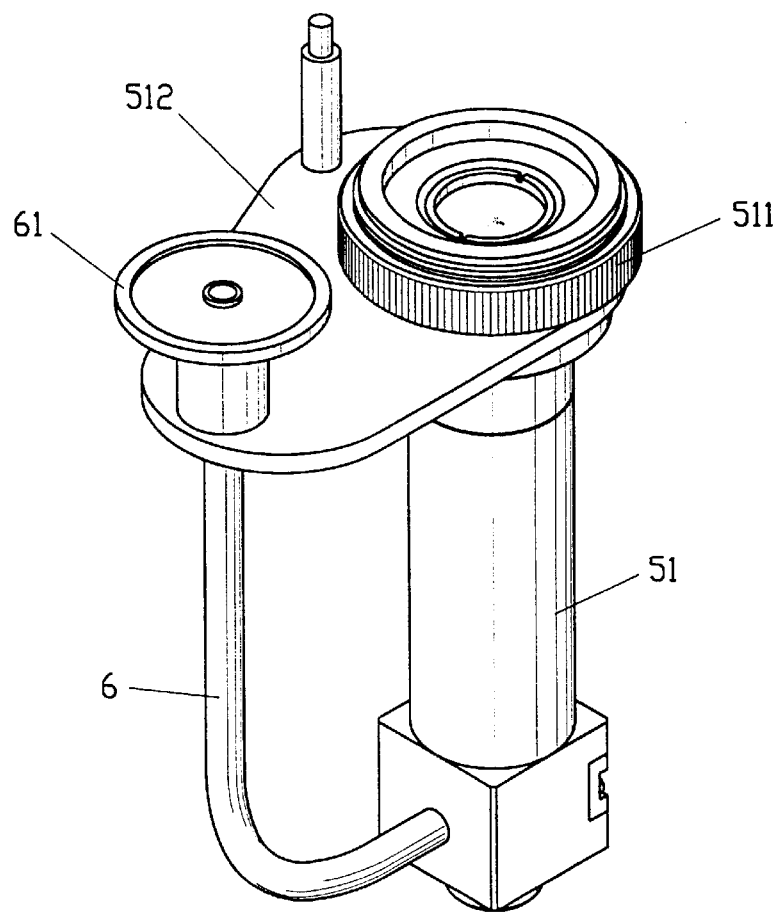
FIG. 5 is a perspective view illustrating a video microscope system in accordance with a first preferred embodiment of the present invention.

Referring to FIGS. 3, 4 and 5, optical fiber 6 is connected to microscope lens unit 51 by fixing plate 512 to be positioned at an output terminal of light source part 31 mounted on the left of an image pickup device 32 when microscope lens unit 51 is connected to image pickup device 32. In addition, a funnel-shaped fixing member 61 is inserted onto optical fiber 6, at an opposite tip to a tip connected to microscope lens unit 51. Funnel-shaped fixing member 61 is screwed by threads 62 to fixing plate 512.

The operation of the lighting device of the video microscope system in accordance with the first preferred embodiment of the present invention is explained as follows. Referring to FIG. 2, a video microscope system 5 is positioned on a stage 4 and, referring to FIG. 3, microscope lens unit 51 is connected to head unit 3 when observing an object using video microscope system 5.

Referring to FIG. 3, fixing ring 511, formed on a top portion of the microscope, is connected to the adapter (not shown) of image pickup device 32, and optical fiber 6 connected to fixing plate 512 which is to be positioned at the output end portion of light source part 31. At this time, funnel-shaped fixing member 61, inserted onto a tip of optical fiber 6, is positioned at the output end portion of diffusion plate 313 to concentrate all the light projected from diffusion plate 313 in light source part 31.

When light source part 31 is driven, a predetermined amount of light is projected from light source 311 and diffused through diffusion plate 313. The light diffused through diffusion plate 313 is concentrated by funnel-shaped fixing member 61 and supplied to microscope lens unit 51 through optical fiber 6 and prism 7.

The light projected from light source part 31 is supplied to prism 7, which is mounted within microscope lens unit 51, through optical fiber 6. Prism 7 reflects or refracts the predetermined amount of light supplied though optical fiber 6 at an angle of ninety degrees (90°) and projects the reflected light to the object positioned on objective part 53.

When the ambient brightness around the object is suitably formed by prism 7, the image of the light corresponding to the ambient brightness around the object is formed by high magnification lens group 514 and transmitted to image pickup device 32, whereby the image is picked up by a charge coupled device (not shown) in image pickup device 32 and processed into a video image and an electrical signal. Referring to FIG. 2, the electrical signal representing the video image is transmitted and reproduced to an original image at image display device 6.

Figure 6:
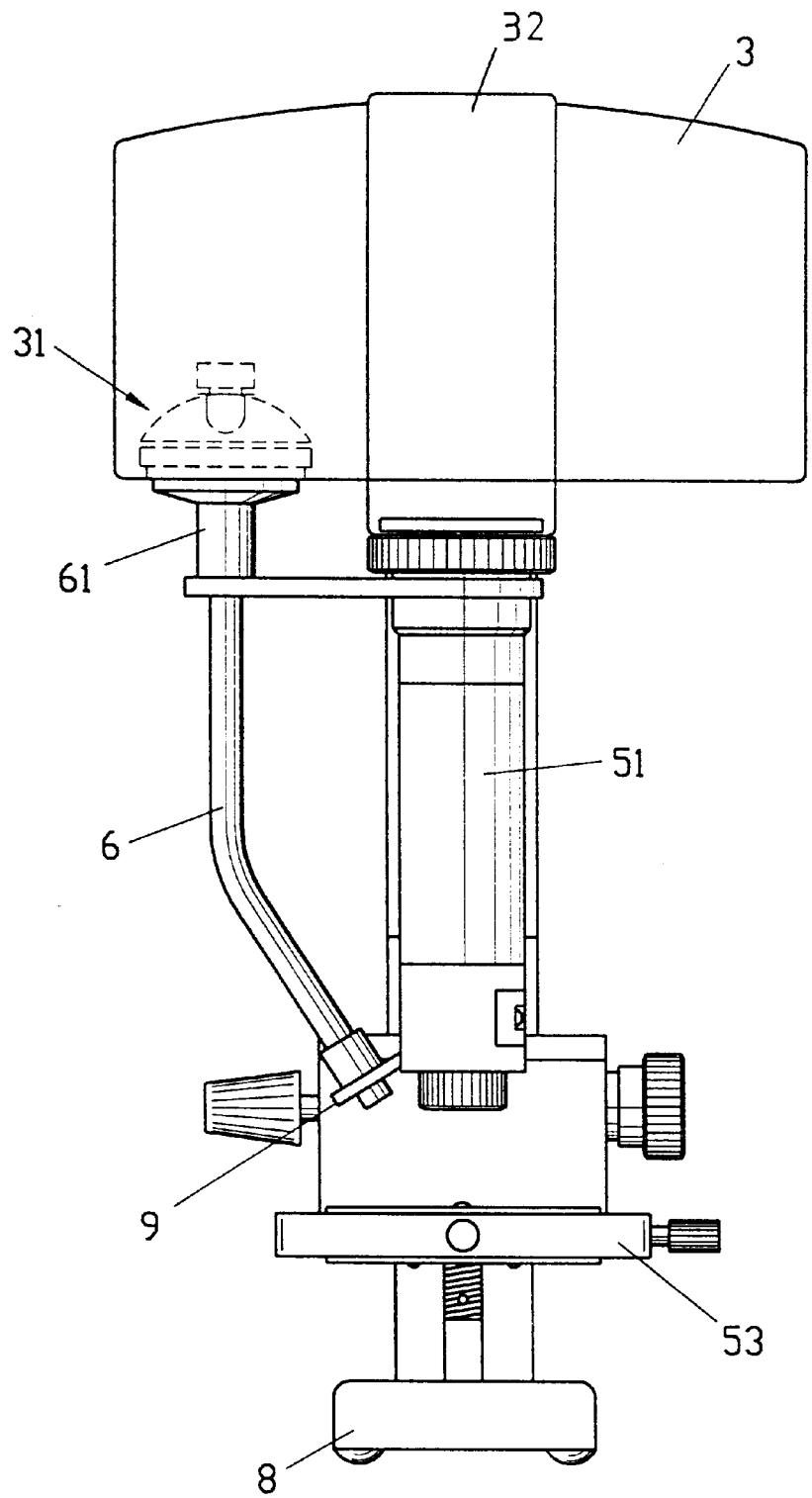
FIG. 6 is a cross-sectional view of a video microscope system in accordance with a second preferred embodiment of the present invention.

Referring to FIG. 6, the operation of a lighting device for a video microscope system in accordance with the second preferred embodiment of the present invention is explained as follows. The lighting device for the video microscope system in accordance with the second preferred embodiment of the present invention includes light source part 31 mounted in head unit 3 for projecting a predetermined amount of light, optical fiber 6 supplies light projected from light source part 31 to an object positioned on objective part 53 and a fixing part 9 fixes an output end portion of optical fiber 6 at the nearest position to the object positioned under a bottom portion of microscope lens unit 51, that is to say on objective part 53.

Optical fiber 6 is inserted into fixing part 9. Fixing part 9 is detachably connected to a left lower end portion of microscope lens unit 51 as illustrated in FIG. 6.

Microscope lens unit 51 has the same construction as the first preferred embodiment of the present invention, as described above, and is connected to head unit 3 and optical fiber 6 in the same manner as the first preferred embodiment of the present invention, also described above. Optical fiber 6 is positioned at the output end portion of light source part 31 and microscope lens unit 51 is connected to image pickup device 32 as in the first preferred embodiment of the present invention, as described above. The light projected from light source part 31 is transmitted by optical fiber 6 and projected directly to the object positioned on objective part 53. Alternatively, fixing part 9 can be connected to project light directly to a prism (not shown in FIG. 6) that would reflect or refract the predetermined amount of light to the objection on the objective part 53.

Figure 7:
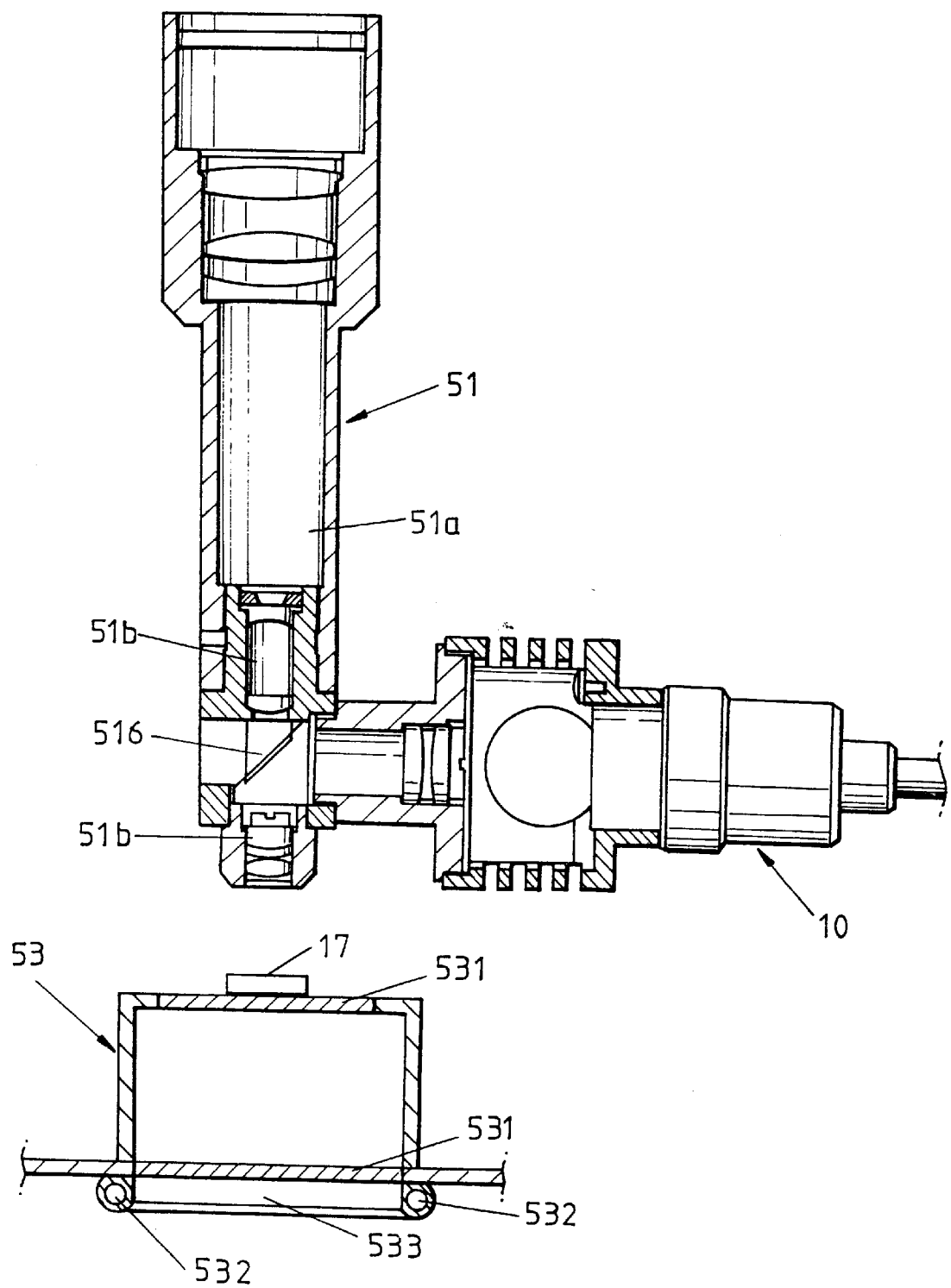
FIG. 7 is a cross-sectional view illustrating a video microscope system in accordance with a third preferred embodiment of the present invention.

The operation of a video microscope system in accordance with the third preferred embodiment of the present invention is explained as follows. Referring to FIG. 7, a video microscope system in accordance with the third preferred embodiment of the present invention is connected to a video presenter (not shown in FIG. 7) and includes microscope lens unit 51, a lighting device 10, and objective part 53. Microscope lens unit 51 includes a lens barrel 51a, a plurality of lenses 51b inserted in lens barrel 51a, and an internal reflective mirror 516 for reflecting the light projected from lighting device 10 and supplying the reflected light to an object 17, which is placed on objective part 53.

Lighting device 10 is horizontally connected to a side of microscope lens unit 51, and projects the light to reflective mirror 516, which is mounted within microscope lens unit 51, thereby supplying the reflected light to object 17. Object 17 is positioned on objective part 53 in line with an optical axis of microscope lens unit 51.

In addition, objective part 53 includes the two diffusion plates 531, (which are collectively shown in FIG. 3 also) a projecting plate 533, and the lamps 532 mounted below diffusion plates 531. Diffusion plates 531, projecting plate 533, and lamps 532 are used when it is desired to pick up the projected image of the internals of object 17. Accordingly, lamps 532 of objective part 53 are turned ON and the light is projected to object 17 through projecting plate 533 and diffusion plates 531 when a user takes an internal picture of the projecting image of object 17. When the user wants to observe a portion of object 17 using video microscope system 5, the lighting method is different according to whether external or internal portions of the object are to be observed.

The surface of object 17 is exposed to light using only lighting device 10, connected to microscope lens unit 51, when object 17 is opaque or the part to be picked up is an external surface portion of object 17. At this time, lamps 532, which are mounted in a bottom portion of objective part 53, are not used. However, when object 17 is transparent or semitransparent, and object 17 is exposed to light to observe the inside of object 17, then object 17 is exposed to both lamps 532, which are mounted in the bottom portion of objective part 53, and lighting device 10, which is connected to microscope lens unit 51.

The image pickup of the surface of object 17 by the above-mentioned system is carried out as follows. First, the light projected from lighting device 10, attached to the side of microscope lens unit 51, is reflected by reflective mirror 516, which is mounted within microscope lens unit 51. The reflected light advances along an optical path of microscope lens unit 51 and is projected to object 17. Accordingly, microscope lens unit 51 forms the image of object 17 placed on objective part 53 and the formed image of the object is transmitted to the head unit along the optical path of microscope lens unit 51.

The image of object 17, transmitted to the video machine and picked up by the image pickup device, is converted into an electric signal. The electrical signal is transmitted to a monitor (not shown) which reproduces the image, whereby the user can observe object 17 on the monitor.

In addition, the light may be projected to the bottom part of object 17 by turning ON lamps 532, which are attached to objective part 53, while driving lighting device 10 when the user desires to observe the projected image of the internals of object 17. Accordingly, the internal image of object 17 is supplied to the head unit and is picked up, processed, and reproduced at a monitor as described above.

As described above, the effect of the present invention lies in that a predetermined amount of light is easily supplied to the object by the use of an internal lighting device in the video presenter or mounted to the side of the video microscope system. The video microscope system is connected to a video presenter, such as the video presenter, for observing the object. This invention eliminates the inconvenience that an individually controlled projecting angle of the light causes. Additionally, a user does not have to supply an external light source having the brightness required for observing the object, thus it is more convenient to carry the video microscope system because of its compactness. In addition, the projected image of the internals of a transparent or semitransparent object can be easily observed using the lamps mounted in the bottom portion of the objective part.

Other embodiments of the invention will be apparent to the skilled in the art from consideration of the specification and practice of the invention disclosed herein. It is intended that the specification and examples be considered as exemplary only, with the true scope and spirit of the invention being indicated by the following claims.

What is claimed is:

1. A video microscope system which is attachable to a video presenter having a lighting device for emitting a predetermined amount of light and an image pickup device for picking up an image of an object, comprising:

a microscope lens unit having a plurality of lenses and being detachably connected to the image pickup device of the video presenter;

light transmitting means for projecting the light emitted from the lighting device of the video presenter to the object;

a fixing member for connecting the light transmitting means to the lighting device of the video presenter;

a fixing ring for connecting the microscope lens unit to the image pickup device of the video presenter; and an objective part for receiving the object.

2. The video microscope system of claim 1, further comprising:

reflective means, mounted within the microscope lens unit, for reflecting the light transmitted by the light transmitting means and projecting the reflected light to the object.

3. The video microscope system of claim 2, wherein the reflective means is a prism.

4. The video microscope system of claim 1, wherein the light transmitting means is an optical fiber.

5. The video microscope system of claim 1, wherein the lighting device comprises:

a light source for emitting light;

a diffusion plate for diffusing the light projected from the light source; and a reflective plate mounted in a rear part of the lighting device for reflecting the projected light to the diffusion plate.

6. The video microscope system of claim 1, wherein the objective part includes:

a plurality of lamps mounted in a lower part of the objective part for projecting a predetermined amount of light to a lower part of the object; and a plurality of diffusion plates coupled at a predetermined interval for diffusing the light projected from the plurality of lamps to the object.

7. A video presenter comprising:

a main body comprising a stage for receiving an object;

a supporting member, extended upward from one side of the main body;

a head unit supported by the supporting member comprising:

a lighting device for emitting a predetermined amount of light; and an image pickup device, hinged on an upper portion of the supporting member, for picking up an image of an object;

a microscope lens unit, detachably connected to the image pickup device, having a plurality of lenses;

light transmitting means for projecting the light emitted from the lighting device to the object; and an objective part, placed on the stage, for receiving the object.

8. The video presenter of claim 7, wherein the main body further comprises an internal light box with a built-in light source.

* * * * *